Dec. 4, 1962   W. C. GUNGLE ET AL   3,067,351
APERTURE FLUORESCENT LAMP
Filed Jan. 4, 1960

WARREN C. GUNGLE
JOHN F. WAYMOUTH
INVENTORS

BY Lawrence Burns,
ATTORNEY

United States Patent Office 3,067,351
Patented Dec. 4, 1962

3,067,351
APERTURE FLUORESCENT LAMP
Warren Calvin Gungle, Danvers, and John F. Waymouth, Marblehead, Mass., assignors to Sylvania Electric Products Inc., a corporation of Delaware
Filed Jan. 4, 1960, Ser. No. 422
4 Claims. (Cl. 313—109)

This invention relates to electric discharge lamps and particularly to fluorescent lamps. It is especially directed to lamps having a phosphor coating, but in which a major portion of the light output is emitted through an aperture in said coating; that is, through a phosphor-free portion of the lamp envelope.

Fluorescent lamps are conventionally made of lime glass which contains at least 15% soda ($Na_2O$). This glass works satisfactorily in the usual lamps in which the phosphor coating extends over substantially the entire lamp envelope, except for the ends, which are capped by a base.

However, we have found that when such a glass is used with a lamp having an aperture in its fluorescent coating; that is, with what we will call an "aperture lamp" for convenience, the aperture blackens fairly rapidly in use, confining the usefulness of the lamp to a short period.

We have discovered that this blackening is caused by the presence of alkali, such as sodium or potassium in the glass, the alkali apparently diffusing to the surface when the lamp bulb is heated during normal lamp processing and combining with the mercury vapor usually present in such lamps.

We have further discovered that a drastic reduction in blackening can be achieved by using a glass in which the alkali content is below about 5%. The presence of an appreciable amount of boron oxide in the glass is also beneficial as is also the presence of arsenic oxide.

A particularly useful glass is one containing about 72% silica, 4% soda, 0.2% potassium oxide, 16% boron oxide, 6% lead oxide (PbO) and about 1% each of aluminum oxide and arsenic oxide. With this glass, the transmission through the aperture is about 93% at 100 hours of operation and 88% at 2000 hours operation as compared with 68% at 100 hours and 63% at 2000 hours for lime glass. Both sets of figures are for operation of the lamp at 50 watts per foot loading. The blackening at a loading of 25 watts per foot is almost the same in each case.

The use of a reflector coat of a material such as titanium dioxide between the phosphor coating and the surface of the glass will reflect light from the phosphor coating back into the lamp and out through the aperture, thereby increasing the brightness of the light at the aperture. When the loading is 100 watts per foot, a filling of 50% neon and 50% helium is very effective for the gas through which the electric discharge occurs in the lamp.

Other features, objects and advantages will be apparent from the following description, taken in connection with the accompanying drawing in which.

Figure 1:
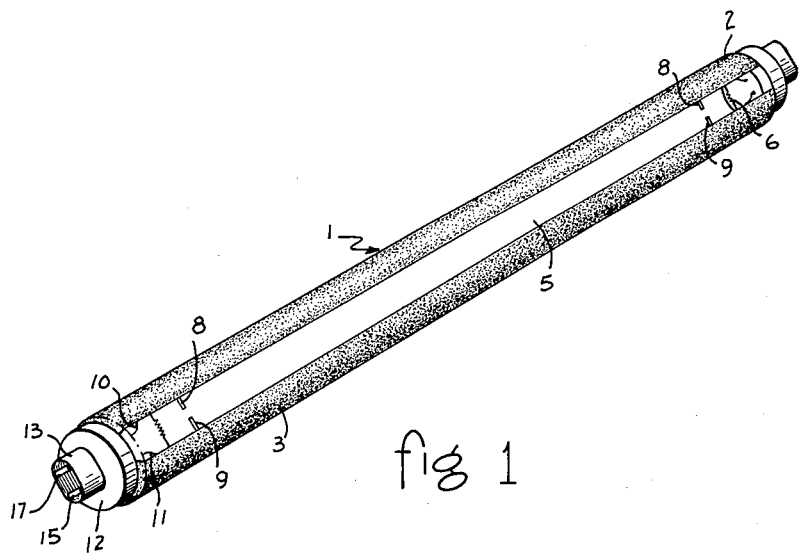
FIGURE 1 shows one embodiment of a device according to the invention.
Figure 2:
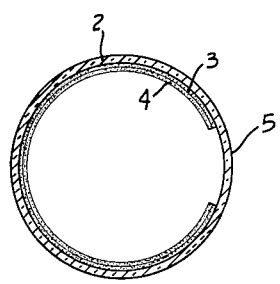
FIGURE 2 shows a cross-section through the middle of said device.

In FIGURE 1, the lamp 1 has a sealed hollow glass tube 2 containing a filling of 50% neon and 50% helium therein (although other suitable gas fillings can be used), with enough mercury to produce a vapor pressure of about 10 microns. On the inside surface of the tube 2 there is a coating 3 of titanium dioxide and a coating 4 of the phosphor, for example calcium halophosphate activated with antimony and manganese or any other suitable fluorescent lamp phosphor. These coatings are shown in section in FIG. 2 and extend around about 315° of the circumference of the tube, the other 45° portion 5 being left free of coating to allow the light to emerge therethrough. Other sizes of aperture can be used, the brightness increasing as the aperture is reduced.

At each end of the glass tube 1, there is an electrode 6, comprising an oxide-coated tungsten coil 7, two auxiliary anodes 8, 9, and the support and lead-in wires 10, 11, as shown for example in a United States Patent application Serial No. 742,928, filed June 18, 1958, by John F. Waymouth et al., for a Fluorescent Lamp. The usual insulating plastic base 12, with the boss 13 carrying contacts 14, 15, can be as shown, for example, in United States Patent 2,896,187, issued July 21, 1959 to R. B. Thomas and S. C. Shappell, for a Lamp Base, or some other suitable base can be used.

The coatings may be applied at first over the entire bulb by methods well-known in the art, and then scraped or brushed off from the part 5 of the glass tube 2, as desired.

As explained above, if the glass tube 1 is made of lime glass, that is one containing about 15% or more of soda, the uncoated portion 5 of the glass will blacken rapidly during operation. (The usual soda-lime glass used in the envelopes of fluorescent lamps contains about 15% by weight of soda.)

Accordingly, the lamp tube 2 in the embodiment described was made of a glass having a composition of about 72% silica, about 6% lead oxide, about 4% soda, about 0.2% potassium oxide, about 16% boron oxide and about 1% each of aluminum oxide and arsenic oxide.

Measurements of the light transmission of the uncoated portion 5 after 100 hours of operation have been given above. Measurements of the relative brightness of the uncoated portion 5, generally called the aperture, in arbitrary but linear units, are given below.

| Hours of Operation | Relative Brightness | |
|---|---|---|
| | Lime Glass Lamp | Applicants' Lamp |
| 0 | 100 | 105 |
| 100 | 83 | 98 |
| 500 | 65 | 88 |
| 1,000 | 61 | 81 |
| 1,750 | 52 | 72 |

The lamps in the above test were identical except for the glass; each was in the usual "40-watt" size, that is, 48 inches long and 1½ inches in diameter, and operated at 25 watts per foot, that is, at about 100 watts input to the lamp.

What we claim is:
1. A fluorescent lamp comprising an envelope, a phosphor coating on a major portion only of said envelope, the other portion of said envelope being free from phosphor so that light can emerge therethrough without passing through the fluorescent coating, said envelope being of a glass having less than 5% alkali content by weight and having a low lead content.

2. The lamp of claim 1, and a reflector coating outside said phosphor coating to direct light therefrom back into the lamp so that it will emerge through the portion of the envelope which is free from phosphor coating.

3. A fluorescent lamp comprising a tubular envelope of glass containing less than about 5% alkali and having a low lead content, a filling of mercury vapor therein, a phosphor coating around the major portion of the inside circumferential surface of said tube, the remaining portion of said circumferential surface being free from phosphor coating, whereby the emitted light from the lamp will emerge through said minor portion.

4. A fluorescent lamp comprising an envelope, a phosphor coating on a major portion only of said envelope, the other portion of said envelope being free from phosphor so that light can emerge therethrough without passing through the fluorescent coating, said envelope being of a glass consisting essentially of about 72% silica, about 4% alkaline oxide, about 16% boron oxide, about 6% lead oxide, about 1% aluminium oxide and 1% arsenic oxide, the percentages being by weight.

References Cited in the file of this patent

UNITED STATES PATENTS

| | | |
|---|---|---|
| 2,407,379 | Morehouse | Sept. 10, 1946 |
| 2,509,071 | Pennybacker | May 23, 1950 |
| 2,611,383 | Noel | Sept. 23, 1952 |
| 2,643,020 | Dalton | June 23, 1953 |
| 2,719,932 | Stanworth | Oct. 4, 1955 |
| 2,777,091 | Rixton | Jan. 8, 1957 |

FOREIGN PATENTS

| | | |
|---|---|---|
| 603,326 | Great Britain | June 14, 1948 |
| 919,835 | Germany | Nov. 4, 1954 |